US007864996B2

(12) United States Patent
Hemmer et al.

(10) Patent No.: US 7,864,996 B2
(45) Date of Patent: Jan. 4, 2011

(54) SYSTEM FOR MACROSCOPIC AND CONFOCAL IMAGING OF TISSUE

(75) Inventors: Paul Hemmer, Rochester, NY (US); Zachary M. Eastman, Pittsford, NY (US); Jay M. Eastman, Pittsford, NY (US); William J. Fox, Rochester, NY (US); James M. Zavislan, Pittsford, NY (US)

(73) Assignee: Lucid, Inc., Rochester, NY (US)

( * ) Notice: Subject to any disclaimer, the term of this patent is extended or adjusted under 35 U.S.C. 154(b) by 1263 days.

(21) Appl. No.: 11/357,234

(22) Filed: Feb. 17, 2006

(65) Prior Publication Data

US 2007/0206275 A1    Sep. 6, 2007

(51) Int. Cl.
  *G06K 9/00*    (2006.01)
(52) U.S. Cl. ...................................... 382/128
(58) Field of Classification Search ................. 382/133, 382/134, 171, 128, 240; 345/611; 600/407
See application file for complete search history.

(56) References Cited

U.S. PATENT DOCUMENTS

| 5,034,613 | A | 7/1991 | Denk et al. |
| RE34,214 | E | 4/1993 | Carlsson et al. |
| 5,297,034 | A | 3/1994 | Weinstein |
| 5,381,224 | A | 1/1995 | Dixon et al. |
| 5,473,706 | A | 12/1995 | Bacus et al. |
| 5,532,873 | A | 7/1996 | Dixon |
| 5,532,874 | A | 7/1996 | Stein |
| 5,548,661 | A | 8/1996 | Price et al. |
| 5,602,674 | A | 2/1997 | Weissman et al. |
| 5,655,029 | A | 8/1997 | Rutenberg et al. |

(Continued)

FOREIGN PATENT DOCUMENTS

WO    WO 00/49392    8/2000

(Continued)

OTHER PUBLICATIONS

Rajadhyaksha, M. et al., Confocal Laser Microscope Images Tissue In Vivo, Laser Focus World, Feb. 1997, pp. 119-127.

(Continued)

*Primary Examiner*—Anand Bhatnagar
*Assistant Examiner*—Claire Wang
(74) *Attorney, Agent, or Firm*—Kenneth J. Lukacher (57) ABSTRACT

A system for macroscopic and confocal imaging of tissue having a macroscopic imager for capturing a macroscopic image of the tissue's surface, a confocal imager for capturing one or more optically formed sectional microscopic images on or within tissue, a computer for receiving images from such imagers, and a tissue attachment device in which the macroscopic imager and confocal imager are each individually presented to the tissue utilizing the tissue attachment device in a predefined alignment, such that imaging locations of the confocal imager with respect to the tissue surface spatially correlate with macroscopic image. A user interface is operable on the computer to enable display of the macroscopic image on a display coupled to the computer, and to indicate a region within the macroscopic image associated with the field of view of the tissue imagable by the confocal imager. The user interface enables graphical tracking and targeting of imaging locations of the confocal imager in macroscopic image, and marking on the macroscopic image of the locations of confocal images with respect to the tissue surface.

22 Claims, 9 Drawing Sheets

U.S. PATENT DOCUMENTS

| | | | |
|---|---|---|---|
| 5,719,700 | A | 2/1998 | Corcuff et al. |
| 5,737,121 | A | 4/1998 | Dixon |
| 5,788,639 | A | 8/1998 | Zavislan et al. |
| 5,793,969 | A | 8/1998 | Kamentsky et al. |
| 5,796,861 | A | 8/1998 | Vogt et al. |
| 5,836,872 | A | 11/1998 | Kenet et al. |
| 5,836,877 | A | 11/1998 | Zavislan et al. |
| 5,838,815 | A | 11/1998 | Gur et al. |
| 5,848,177 | A | 12/1998 | Bauer et al. |
| 5,851,181 | A | 12/1998 | Talmor |
| 5,880,880 | A | 3/1999 | Anderson et al. |
| 5,891,619 | A | 4/1999 | Zakim et al. |
| 5,995,867 | A | 11/1999 | Zavislan |
| 6,014,451 | A | 1/2000 | Berry et al. |
| 6,031,929 | A | 2/2000 | Maitz et al. |
| 6,031,930 | A | 2/2000 | Bacus et al. |
| 6,049,622 | A | 4/2000 | Robb et al. |
| 6,072,624 | A | 6/2000 | Dixon et al. |
| 6,078,681 | A | 6/2000 | Silver |
| 6,101,265 | A * | 8/2000 | Bacus et al. ............ 382/133 |
| 6,151,127 | A | 11/2000 | Kempe |
| 6,208,374 | B1 | 3/2001 | Clinch |
| 6,263,233 | B1 | 7/2001 | Zavislan et al. |
| 6,272,235 | B1 | 8/2001 | Bacus et al. |
| 6,330,106 | B1 | 12/2001 | Greenwald et al. |
| 6,370,422 | B1 | 4/2002 | Richards-Kartum et al. |
| 6,411,434 | B1 | 6/2002 | Eastman et al. |
| 6,424,852 | B1 | 7/2002 | Zavislan |
| 6,493,460 | B1 | 12/2002 | MacAulay et al. |
| 6,606,413 | B1 | 8/2003 | Zeineh |
| 6,608,628 | B1 | 8/2003 | Ross et al. |
| 6,684,092 | B2 | 1/2004 | Zavislan et al. |
| 6,707,461 | B1 * | 3/2004 | Tomack et al. ............ 345/611 |
| 6,728,567 | B2 * | 4/2004 | Rather et al. ............ 600/407 |
| 6,745,067 | B1 | 6/2004 | Zavislan et al. |
| D492,997 | S | 7/2004 | DiStasio |
| D523,883 | S | 6/2006 | Distasio et al. |
| 7,155,049 | B2 * | 12/2006 | Wetzel et al. ............ 382/133 |

FOREIGN PATENT DOCUMENTS

| | | |
|---|---|---|
| WO | WO 01/35325 A1 | 5/2001 |
| WO | WO 02/073246 A2 | 9/2002 |
| WO | WO 2004/104645 A2 | 12/2004 |

OTHER PUBLICATIONS

Rajadhyaksha, M. et al., In Vivo Confocal Scanning Laser Microscopy of Human Skin: Melanin Provides Strong Contrast, The Journal of Investigative Dermatology, Jun. 1995, vol. 104, No. 6, pp. 946-952.

Schmitt, Joseph M. et al., Optical Characterization of Dense Tissues Using Low-coherence Interferometry, 1993, SPIE vol. 1889, pp. 197-211.

VivaScope 1500 Brochure, Lucid, Inc.

VivaScope 2100 Brochure, Lucid, Inc.

VivaScope 2500 Brochure, Lucid, Inc.

* cited by examiner

SYSTEM FOR MACROSCOPIC AND CONFOCAL IMAGING OF TISSUE

FIELD OF THE INVENTION

The present invention relates to a system (and method) for macroscopic and confocal imaging of tissue, and relates particularly to a system for macroscopic and confocal imaging of tissue having a macroscopic imager and a confocal imager each individually presentable to tissue, via a tissue attachment device, in a predefined alignment which spatially correlates images from the confocal imager within an image from the macroscopic image. Also, the present invention relates to a user interface operable on a computer coupled to such macroscopic and confocal imagers to enable display of the macroscopic image and confocal images from the macroscopic and confocal imagers, respectively, and graphical tracking and targeting of imaging locations of the confocal imager in the macroscopic image, and marking on the macroscopic image of the locations of selected confocal images with respect to the tissue surface.

BACKGROUND OF THE INVENTION

Confocal microscopes optically section tissue to produce sectional microscopic images of tissue, referred to herein as confocal images. An example of a confocal microscope is the VivaScope® manufactured by Lucid, Inc. of Rochester, N.Y. Other examples of confocal microscopes are described in U.S. Pat. Nos. 5,788,639, 5,880,880, and 5,995,867, and in articles by Milind Rajadhyaksha et al., "In vivo Confocal Scanning Laser Microscopy of Human Skin: Melanin provides strong contrast," The Journal of Investigative Dermatology, Volume 104, No. 6, June 1995, and Milind Rajadhyaksha and James M. Zavislan, "Confocal laser microscope images tissue in vivo," Laser Focus World, February 1997, pages 119-127. The confocal microscope may image naturally or surgically exposed in-vivo tissue, which is useful to evaluate a lesion in tissue without needing a biopsy and pathological evaluation on slides of histologically prepared, mechanically sectioned, tissue specimens from such biopsy. Also, confocal microscopes are useful for pathological examination of ex-vivo tissue, i.e., tissue removed from a patient, without requiring that such tissue be mechanically sectioned and histologically prepared for viewing on slides with a traditional microscope.

Systems have been developed for obtaining a macroscopic image of tissue for use in locating where sectional microscopic images were imaged in such tissue by a confocal microscope. U.S. Pat. Nos. 6,684,092 and 5,836,877 describe a telepathology system having a camera and confocal imager in a fixed spatial relationship, in which both are presented over the tissue, such that the camera captures a macroscopic image and the confocal imager captures one or more confocal images. Instead of the camera, the confocal imager described in these patents may utilize a different objective lens to obtain the macroscopic image. The locations for imaging by the confocal imager may be selected automatically, or manually by the user using the macroscopic image. The macroscopic image and confocal images taken are then viewable on the display of the computer, in which the location of confocal images may be referenced in the macroscopic image of the tissue.

U.S. Pat. No. 6,411,434 describes a system for imaging ex-vivo tissue in a cassette, where a camera views one side of the tissue to provide a macroscopic image, and on the other side of the tissue is imaged by a confocal microscope. A display can provide an image of both the macroscopic image and confocal images in which the relative location of the microscopic image is indicated by an outlined region in the displayed macroscopic image.

U.S. patent application Ser. No. 10/471,332, filed Feb. 23, 2004, which has priority to International Patent Application No. PCT/US02/07173, published on Sep. 19, 2002 under International Publication No. WO02/073246A2, describes a confocal microscope having a macroscope, and a turret having different objective lens to enable selection of an objective lens for macroscopic imaging or microscopic imaging, in which light from the tissue through the selected objective lens is provided to optics of the macroscope or confocal microscope, respectively. Sites may be marked, such as on a printout, of the macroscopic image, and then using the macroscopic image on a display, the tissue is moved to each site for obtaining sectional microscopic confocal image(s).

Other systems for locating confocal images captured by a confocal microscope have been developed without use of a camera or macroscopic image. For example, U.S. Pat. Nos. 6,424,852 and 6,745,067 each describe a pen or marker mechanically coupled to a translation stage of a confocal microscope to record movements of the stage on a paper pad or recording medium below the pen or marker. U.S. Pat. No. 6,745,067 also describes a system for marking on a physical recording medium located on the tissue, such as a label, after confocal imaging of the tissue is completed, in which the marks placed are in accordance with one or locations of selected confocal images during confocal imaging of the tissue.

Although the above-described systems are useful, it would be desirable if the macroscopic imaging means need not be physically integrated into the confocal microscope, such that the imaging head of the confocal microscope may be made less complex and smaller, and that the spatial relationship between a camera and confocal microscope were mechanically assured by their individual alignment to the same tissue attachment device, so as to facilitate the tracking, targeting, and marking of confocal images in a macroscopic image captured by such camera.

It would further be desirable to provide means for assisting a physician in future examinations of the same tissue to observe possible changes in the condition of the tissue when treatment of the lesion is deferred or is non-invasive.

SUMMARY OF THE INVENTION

Accordingly, it is one object of the present invention to provide a system for macroscopic and confocal imaging of tissue having a macroscopic imager and a confocal imaging head of a confocal microscope, where the macroscopic imager and confocal image head are each individually aligned to the same tissue attachment device for imaging tissue.

It is another object of the present invention to a system for macroscopic and confocal imaging of tissue having a computer system coupled to a macroscopic imager and confocal microscope for receiving macroscopic and confocal images, respectively, having a user interface facilitating the tracking, targeting, and marking of confocal images in a macroscopic image captured by such macroscopic imager.

It is a further would object of the present invention to a system for macroscopic and confocal imaging of tissue to having a computer system coupled to a macroscopic imager and confocal microscope for receiving macroscopic and confocal images, respectively, having a user interface which enables morphing of macroscopic images of the same tissue captured at different times to observe possible changes in the condition of the tissue.

Briefly described, the present invention embodies a system for imaging tissue having a macroscopic imager for capturing a macroscopic image, and a confocal imager for capturing one or more optically formed sectional microscopic (confocal) images on or within tissue, a tissue attachment device, such as a tissue ring, in which the macroscopic imager and confocal imager are each individually presented to the tissue utilizing the tissue attachment device in a predefined alignment with the device, thereby imaging locations of the confocal imager with respect to the tissue surface spatially correlate with the macroscopic image. A computer system is coupled to the macroscopic imager and microscopic imager, and has a display, and memory for storing at least one macroscopic image received from the macroscopic imager and confocal images when received from the confocal imager.

A user interface operable on the computer system enables display of the macroscopic image on a display coupled to the computer system, and then indicates a region within the macroscopic image associated with a field of view of the tissue imagable by the confocal imager. The user interface enables graphical tracking of the imaging location of the confocal imager in the macroscopic image, and targeting the confocal imager to capture confocal images at one or more imaging locations selected in the macroscopic image. The user interface also enables marking on the displayed macroscopic image of one or more locations of confocal images captured by the confocal imager that were selected by the user for storage in memory of the computer system. Such markings may be capable of indicating different types of confocal image capture.

The computer system may be capable of storing different macroscopic images of the same area of tissue captured at different times, and the user interface morphs (or overlays) two of the macroscopic images of the same area of tissue to produce a morphed (or overlaid) image, and user control of the contribution of the two macroscopic images in the morphed image so as to enable viewing of changes in the same area of tissue over the time period associated with the two macroscopic images.

The invention further embodies a method having the steps of displaying a macroscopic image of the surface of tissue captured by a macroscopic imager, indicating a region within the displayed macroscopic image associated with a field of view imagable by a confocal imager, tracking the two-dimensional position of the confocal imager with respect to the surface of the tissue in the displayed macroscopic image, targeting in the displayed macroscopic image the two-dimensional position of confocal images captured by the microscopic imager with respect to the tissue, and marking on the displayed macroscopic image the location of one or more user selected confocal images.

The user interface represents a graphical user interface operable on a computer system to provide a window displaying a macroscopic image, in which a region is indicated within the macroscopic image that is associated with the tissue imagable by a confocal imager. One or more first graphical elements are provided for enabling tracking and targeting in the region of a two-dimensional imaging location of the confocal imager with respect to the surface of the tissue, and one or more second graphical elements are provided for enabling marking in the region of the window the location of one or more of the confocal images after being captured by the confocal imager and stored in memory by the computer system. The macroscopic image in the window represents a current macroscopic image. The user interface may also have another window selectable by the user displaying one or more previously captured macroscopic images of the same area of tissue. When one of such previously captured macroscopic images is selected, a graphical slide is provided in which the window has an overlaid image of the selected previously captured macroscopic image on the current macroscopic image, in which the contribution of the current and previous macroscopic images in the first window is adjustable by the user utilizing the graphical slide such that the images morph (or blend) into each other.

The user interface of the present invention may be a combined user interface for displaying image from the macroscopic imager and confocal microscope on a single screen, or different screens may be used to provide macroscopic image and confocal images.

Although the application describes confocal imagers for imaging optical formed microscopic sections utilizing confocal microscopy, other imager may be used to provide optical formed microscopic sections operating in accordance with two-photon microscopy or optical coherence tomography.

BRIEF DESCRIPTION OF THE DRAWINGS

The foregoing objects, features and advantages of the invention will become more apparent from a reading of the following description in connection with the accompanying drawings, in which.

DETAILED DESCRIPTION OF THE INVENTION

Figures 1, 1A:
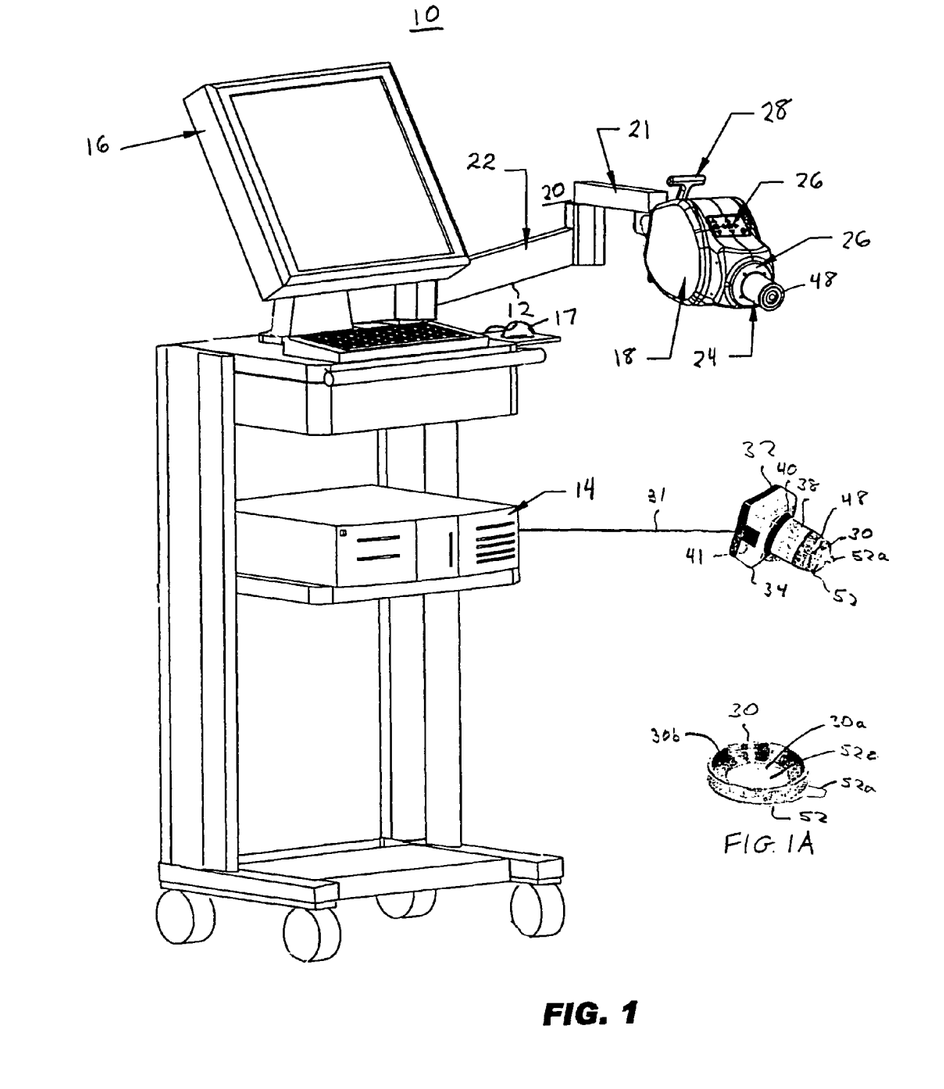
FIG. 1 is a block diagram of the system of the present invention having a confocal microscope with a confocal imager (or imaging head), and a computer system, and a macroscopic imager coupled to the same computer system.
FIG. 1A is a perspective view of tissue attachment device, or tissue ring, attachable to the macroscopic imager and the confocal imager of FIG. 1.

Referring to FIG. 1, the system 10 has a confocal microscope 12 as described in U.S. patent Ser. No. 10/557,461, filed Nov. 18, 2005, having priority to International Patent Application No. PCT/US04/16255, and published Dec. 2, 2004 under International Publication No. WO 2004/104645A2. Such confocal microscope may be a VivaScope®1500 manufactured by Lucid Inc. of Rochester, N.Y. Confocal microscope 12 has a computer system 14, such as a personal computer (PC), coupled to a display 16. The computer system 14 receives confocal images representing optically formed microscopic sectional images, such as cells or other tissue structures, from a confocal imager (imaging head) 18 that is gimble mounted on a multi-axis arm mechanism 20 having front and rear arms 21 and 22. The confocal imager 18 has a nose tube 24, preferably made of clear plastic, which is attached to a conical hub 26 on the front of the confocal imager 18. Handles 28 are manually grasped and moved to permit multi-axis movement of the confocal imager. Cables extend along arms 21 and 22 to supply power and enable communication between confocal imager 18 and computer system 14. There are three stepper motor drivers provided in confocal imager 18 which drive an X direction stage drive motor, a Y direction stage drive motor, and a motor which moves the objective lens of the confocal optics in the confocal imager in the Z direction, respectively, where X, Y, Z are orthogonal dimensions. In imaging tissue, X and Y dimensional are substantially parallel to the surface of tissue being imaged on or through, and Z is substantially perpendicular to such surface to control depth of confocal imaging. The motors are driven either by the user changing the imaging position via the computer system sending signals such motor(s), or via buttons on a control panel 29. As confocal microscope 12 is described in U.S. patent Ser. No. 10/557,461 and International Patent Application No. PCT/US04/16255, which are herein incorporated by reference, a detailed discussion of the confocal microscope 12 and its confocal imager 18 are not provided herein.

System 10 further has a macroscopic imager (or camera) 32 which is connected for data communication via a cable 31 to a port, such as a USB port, of computer system 14, such that the computer system can receive macroscopic images from imager 32. Conventional hardware and software at the imager 32 and computer system 14 may be provided for interfacing and communicating digital images.

Figure 2A:
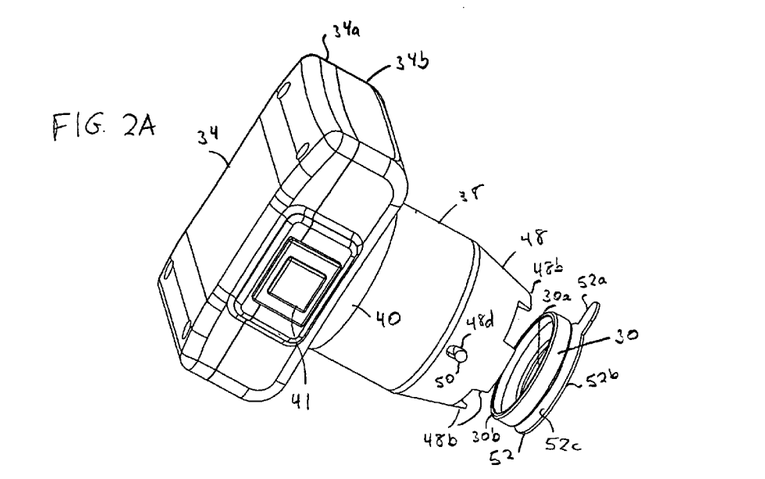
FIG. 2A is a perspective view of the macroscopic imager of FIG. 1 and the tissue attachment device of FIG. 1A.
Figure 2B:
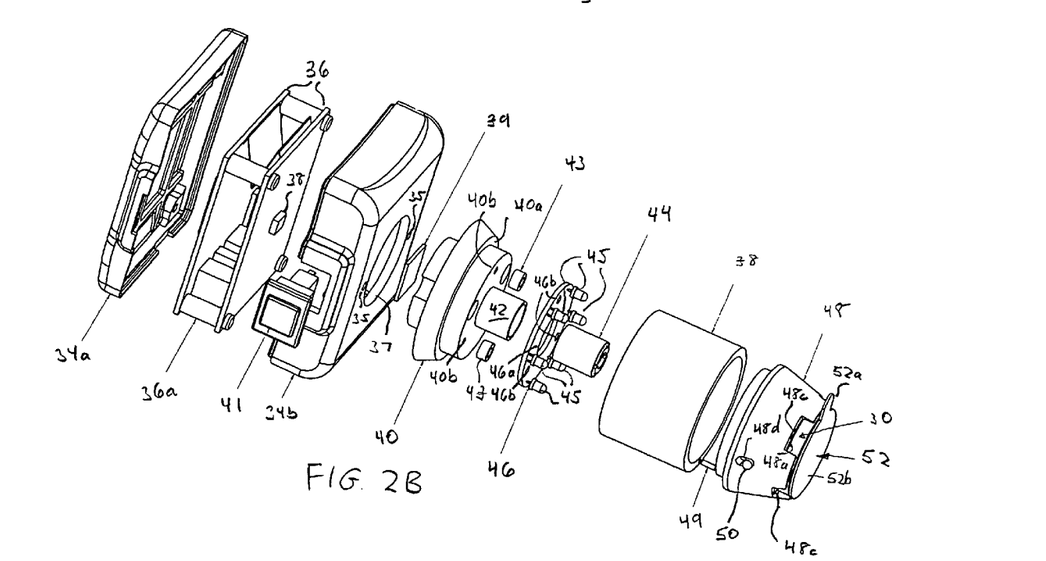
FIG. 2B is an exploded view of the macroscopic imager of FIG. 1.

Referring to FIGS. 2A and 2B, macroscopic imager 32 is shown in more detail. Imager 32 has a housing 34 which is formed by the mating rear housing member 34a and front housing member 34b. Housing members 34a and 34b may be of molded plastic. A pair of printed circuit boards 36 supports the imaging electronics, and includes a CCD array 38. Such CCD array 38 may be a color CCD array similar to that used in a conventional digital camera. The imaging electronics may have a microcontroller or microprocessor programmed to operate the camera for providing live images from the CCD array 38, via cable 31, to computer system 14, and sending a high resolution still image when a switch 41 is pressed, via a cable 31, to computer system 14. Internal electronic components for enabling operation of the imager 32 may be manufactured by Lumenera Corp. of Canada, under model no. Lu100. Communication between the macroscopic imager 32 and computer system 14 for transmitting signals and data between them may be specified by camera electronics' manufacturer. However, conventional electronics of a digital camera may also be used.

A nose tube 38 is attached to housing 34 over an opening 37 in front housing member 34b. Within the nose tube 38 is an assembly of components including a mounting 40 and an IR filter 39 (also available from Lumenera Corp.) received in the backside of mounting 40. Mounting 40 has a threaded hole 42 for receiving a threaded optics barrel 44. Optics 44 may represent one or more lenses for focusing an image onto CCD array 38. For example, two lens doublets may be used. An LED board 46 has a ring of spaced LEDs 45 around an opening 46a. LEDs 45 provide white light illumination and receive power by a cable from circuit boards 36.

Optionally, either in addition to or instead of the ring of white light LEDs, one or more rings of different color LEDs may be provided on board 45 to allow selection of illumination of tissue with different wavelengths or wavelength ranges, in which macroscopic imager's CCD array 38 is sensitive to light is such wavelength or wavelength ranges. When different color LED light is available, housing 34 has button(s) or switch(es) connected to board 36 to enable the user to select which LEDs to activate. Optionally, different color LEDs may be selected by the user via the user interface of the computer system, such that the computer system 14 can instruct the macroscopic camera electronics, via cable 31, to enable the desired LEDs.

Figure 2C:
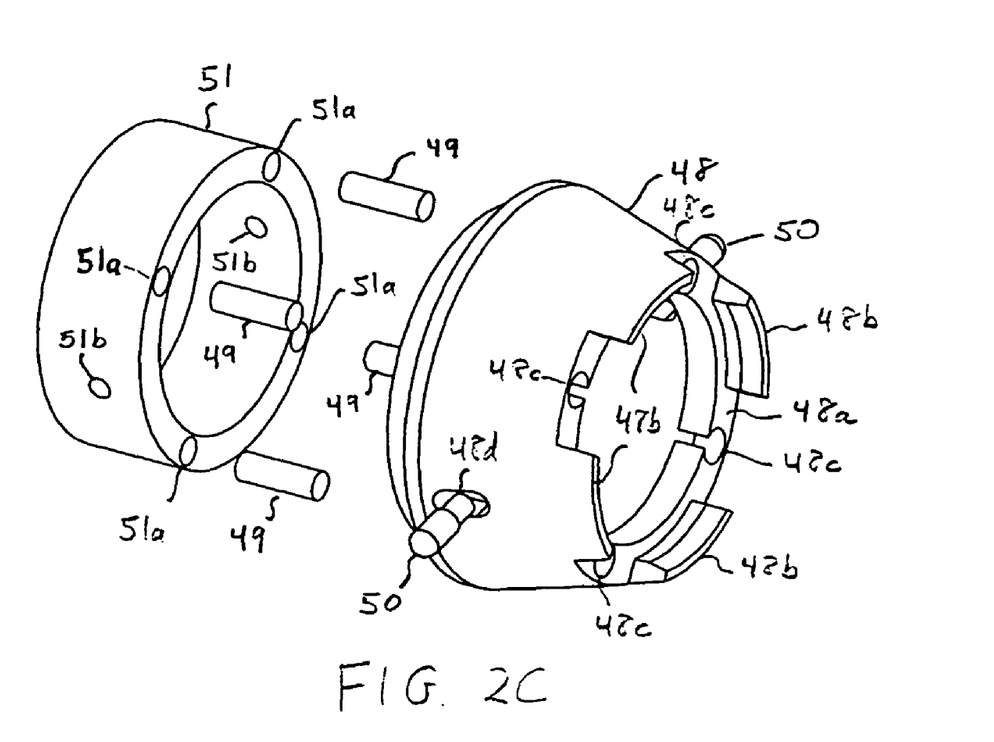
FIG. 2C is an exploded view of the tissue mount ring of the macroscopic imager of FIG. 2B.

A tissue ring mount 48 is attached to the front of nose tube 38. As best shown in FIG. 2C, tissue ring mount 48 is substantially conical in shape and has circular front surface 48a from which extends four prongs 48b having curved inner surface shaped to receive tissue ring 30, as shown in FIG. 2B. In the tissue ring mount 48 is a movable plastic collar 51 having four holes 51a into which four cylindrical shaped magnets 49 are received and fixed therein, such that they partial extend from the collar 51 can be received into four openings 48c extending through front surface 48a. The magnets 49 may be fixed in their respective holes 51a by adhesive (e.g., epoxy). Thus, when the collar 51 is in its forward position the magnets 49 extend through openings 48c, such that they can contact and magnetically capture tissue ring 30 when positioned by a user between prongs 48b. The magnets 49 and openings 48c may be sized such that the top 30b of the tissue ring 30 will abut both front surface 48a and magnets 49 when the tissue ring 30 is magnetically captured, as shown in FIG. 2B.

To assist in detaching the tissue ring 39 from mount 48, two levers 50 are attached in holes 51b via slots 48d in the tissue ring mount 48, such that a user can pull levers 50 backwards in slots 48d in a direction away from tissue ring 30 so as to pull the collar 51 back from its front position, thereby pulling magnets 49 away from tissue ring 30 to reduce the magnet attraction between the magnets 49 and the tissue ring 30. The levers 50 may be screwed into threaded holes 51b, and/or fixed by an adhesive in holes which then need not be threaded. Although magnetic coupling of the tissue ring 30 to mount 48 is preferred, other releasable coupling means may be used, such as use of mechanical latches. Also keys may be provided such that the tissue ring 30 is only locatable is a certain registration with respect to mount 48.

Figure 3:
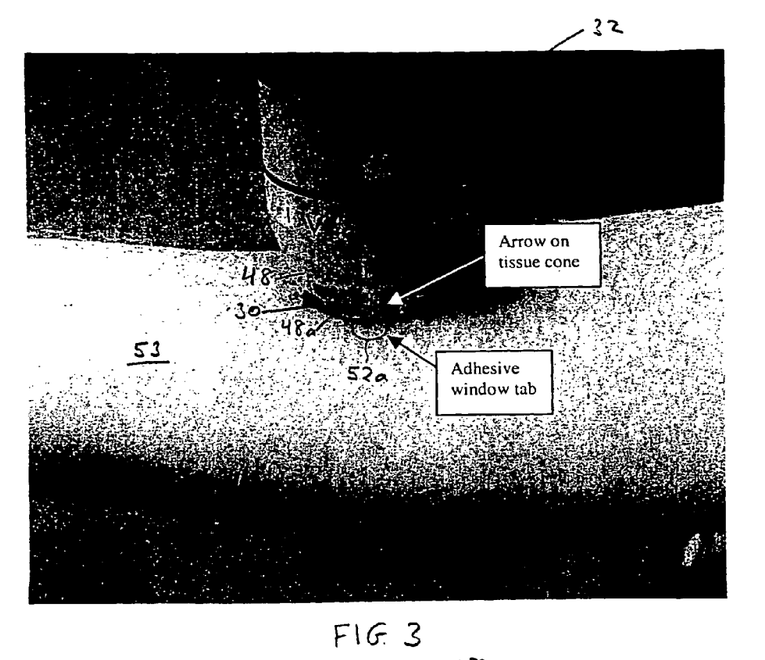
FIG. 3 is a partial view of the front of the macroscopic imager of FIG. 1 when connected and aligned to the tissue attachment device of FIG. 1A which is adhesively coupled to the surface of tissue via a window.
Figure 4:
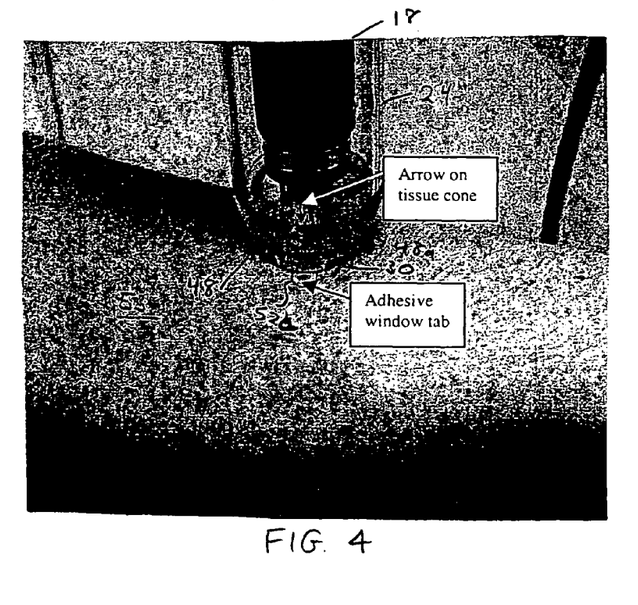
FIG. 4 is a partial view of the front of the confocal imager of FIG. 1 when connected and aligned to the tissue attachment device of FIG. 1A which is adhesively coupled to the surface of tissue via a window.
Figure 5:
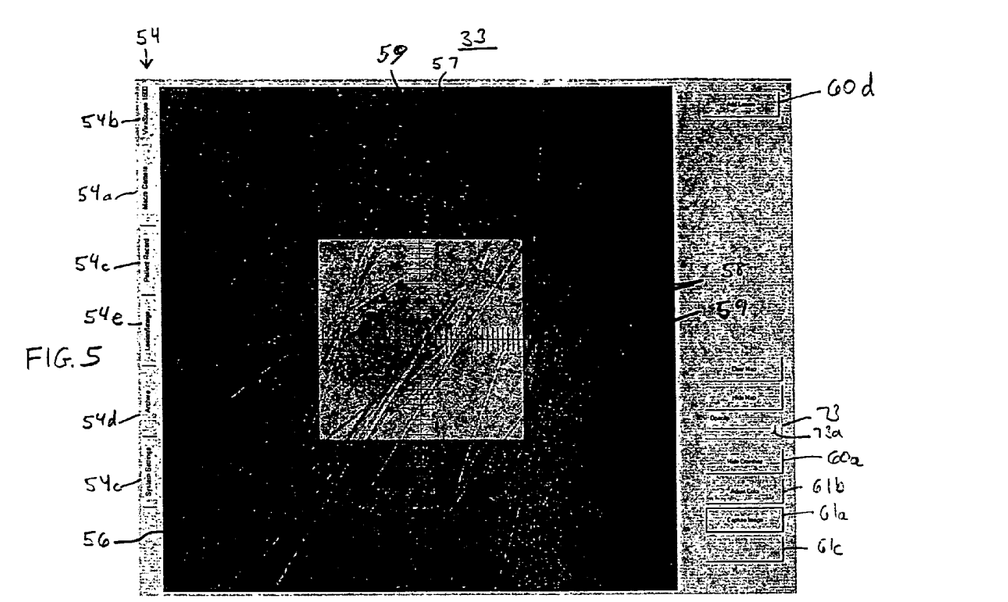
FIGS. 5, 6, and 7 are examples of the user interface operable on the computer system of FIG. 1 showing example of a macroscopic image captured by the macroscopic imager in which a central square region in such window represents the imagable area of the tissue by the confocal imager.

As best shown in FIGS. 1A and 2A, tissue ring 30 represents a tissue attachment device having a central opening 30a. Tissue ring 30 is of metal material magnetically attractive to magnets so as to be releasably engagable by magnetic force to tissue ring mount 48. In use, a circular thin transparent material window 52, such as of plastic or glass, is attached by a ring of adhesive (e.g., double-sided adhesive tape) to the lower face of tissue ring 30, where such ring of adhesive is outside the field of view of opening 30a. A tab 52b extends from the window 52 for use in later detachment of window 52 from tissue ring 30, and for alignment as will be described later below. Another ring of adhesive (e.g., double-sided adhesive tape) is similarly outside the field of view of opening 30a along front surface 52b for attachment to tissue. The tissue ring 30 is shown attached to tissue in the example of FIGS. 3 and 4, whereby tissue is viewable through tissue ring opening 30a and extends beyond the attached tissue ring 30.

To assembly the components together, two screws are received through holes 35 from the interior of front housing member 34b into threaded holes of mount 40. Three screws then extend through holes 46b, via three spacers 43, into threaded holes 40b of mount 40. When assembled, barrel 42 extends through central opening 46a of LED board 46. The back of tube 38 is mounted, such as with adhesive (e.g., epoxy) along annular ledge 40a of mount 40, and tissue ring mount 48 is mounted to the front end of tube 38, such as shown in FIG. 2A. Prior to mounting of tube 38, the optics 44 may be adjusted in the lens barrel 42 to fix the focus of such optics onto CCD array 38 at the plane at or just below the front surface 52a of window 52 when such window is disposed on tissue ring 30. The assembled microscopic imager 32 may be of size and weight to be handheld by a user.

As shown in FIG. 1, an identical tissue ring mount 48 to that described above is mounted on the front of nose tube 24, such that confocal imager 18 may be coupled to tissue ring 30 so as to enable imaging through openings 30a and window 52.

Preferably, the macroscopic imager 32 is calibrated by the user with the attached tissue ring and window assembly to assure that imaging is proper. This can be performed by placing the tissue ring 30 over a white sheet of paper, and providing a window to set image properties. Such image properties may includes fields for adjusting CCD exposure time (e.g. max 65 ms), gain, and white point balance (red, green, and blue gain). If available, the user can enable exposure time, gain, and white point balance to be set automatically by the computer system 14. The computer system 14 may send signals to the macroscopic imager 32 to communicate to macroscopic imager electronics such imaging parameters, and thereby control macroscopic imager 32 operation. Color and white point balance correction may be performed by the computer system on each macroscopic image received.

In operation, the tissue ring 30 with attached window 52 is located on the tissue 53 to be imaged by the macroscopic imager and then the confocal imager 18. Surface 52b of window 52 has a ring of adhesive material to facilitate retaining the tissue ring and its attached window 52 on the tissue surface. Alternatively, the window 52 may be adhesively coupled to tissue and then the tissue ring 30 located over and adhesively coupled to window 52. Either way, the area of the tissue of interest is viewable through opening 30a and thus is centered in opening 30a by the user. Optionally, cross-hair indicia may be printed, or otherwise provided, on one of the flat surfaces of window 52 outside of view of opening 30a and inside the rings of adhesive on such each of said flat surfaces, to assist the user in centering the area of tissue interest.

The macroscopic imager 32 is then presented to the tissue ring 30 which are magnetically attached to mount 48 of imager 32 as described earlier. An arrow 48a on the mount 48 is aligned with the center or window tab 52b by the user rotating the macroscopic imager housing 34 to couple such rotation to tissue mount 48, as shown for example in FIG. 3. Switch 41 is operated by a user to capture a macroscopic image of the tissue surface 53 below and pressed against window 52 through window 52 and tissue ring opening 30a. The macroscopic imager 32 is then removed from the tissue ring 30 with the assistance of moving levers 50 backward, without removal of tissue ring 30 from tissue 53, and replaced with the confocal imager 18 having mount 48 which is then similarly aligned with its arrow 48a centered on window tab 52a, as shown for example in FIG. 4. An immersion fluid may be placed inside the tissue ring 30 before connecting the confocal imager 18. The confocal imager 18 remains so located on the tissue ring 30 throughout the confocal imaging session. Other indicia than arrow 48a may be used to align the tab 52a, such as centered cross hair, or an arrow on such tab, to assist the user in alignment. Optionally, automatic rather than manual alignment may be provided, where the ring 30 has features which key into features of ring mount 48.

The macroscopic image provides a 10×10 mm macroscopic image to computer system 14, which may be, for example, 1000×1000 pixels. This is in contrast with the 4×4 mm imagable area of the confocal imager. Power to the board 36 in imager 32 may be supplied via the USB cable 31 or by a battery in housing 43. The housing members 34a and 34b, mount 40, tube 38, barrel 44, and tissue ring mount 48 may be of molded plastic material, and preferably tissue ring mount 48 is of clear molded plastic. The macroscopic imager of the present invention also may represent a conventional digital camera adapted to have mount 48, which can be interfaced to computer system 12 so as to received digital images from the camera.

The macroscopic imager 32 may optionally be used to assist the user in the selection of the tissue to be confocally imaged while the tissue ring 30, and window 52 attached thereto, is attached to imager 32, but before the tissue ring and window assembly is adhesively attached to tissue. Thus, the macroscopic imager 32 sends to macroscopic image to computer system 14 for display as live macroscopic images on the user interface 33 while the user moves the imager 32 along and slightly above the tissue surface to scan for an area of interest, such as a lesion in the tissue. When such area is viewed it is centered in the field of view of the macroscopic image, the user than applies sufficient pressure on the macroscopic imager in the direction of the tissue such that adhesive on the lower surface of the window 52 facing the tissue adheres and retains the tissue ring and window assembly on the tissue. When the tissue ring is so applied, alignment of the macroscopic imager 32 is verified and a macroscopic image is then captured. The macroscopic imager is then detached from the tissue ring 30, and confocal imager 18 attached and aligned to the tissue ring for capture of confocal images as described earlier.

Referring to FIGS. 5-9, the user interface 33 for the macroscopic imager 32 will now be described. The user interface represents a program or application operating in memory of the computer system 14, and preferably is running when the macroscopic imager is connected to the computer system. The user interface 33 is a graphical user interface in that a typical pointing mechanism such as a mouse 17 (FIG. 1) is coupled to computer system 14 to enable the user to move, select (click) and/or drag a displayed cursor or graphical element, as typical of mouse functionality. Other pointing mechanisms may also be used, such as a touch screen, track ball, or the like, coupled to the computer system 14. The user interface has various tabs 54 along the side of a window 56. Selection of the macro camera tab 54a provides the macroscopic imager user interface 33 shown. The macroscopic imager 32 when placed and aligned in the tissue ring 30, as describe above, provides live images in window 56. When switch 41 is pressed a high resolution macroscopic image 57 is displayed in window 56. A center region 58 within the window 56 represents a two-dimensional representation of 4×4 mm field of view of the tissue imagable by the confocal imager 18 of confocal microscope 12. The part of the window 56 outside of this region 58 may be darkened by reducing brightness of pixels in this region, and/or effecting contrast or color. Cross hairs 59 may added or removed by selecting button 60a.

Figure 6:
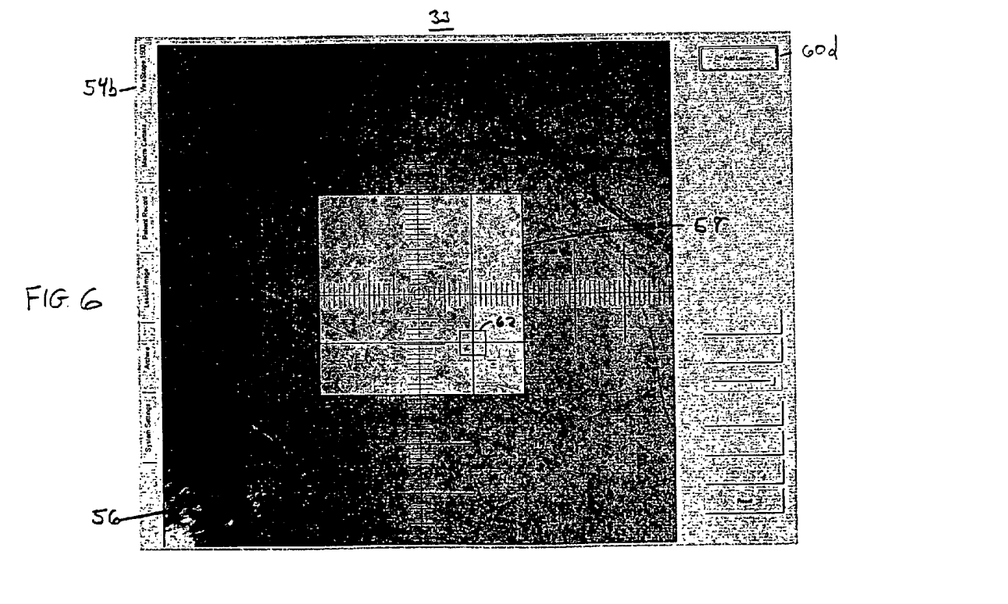

In FIG. 6, a small square box 62 illustrates the present location of a 0.5×0.5 mm image capture frame of the confocal imager 18 from the current X and Y imaging position (e.g., of X and Y motors) of the confocal imager. The imaging frame position (with respect to the tissue surface) of the confocal imager 18 spatially correlates with the macroscopic image by the alignment of the macroscopic imager and confocal imager with the same tissue ring 30. The box 62 follows, or is, the mouse cursor and represents the X and Y positions that the operator can navigate the confocal imager to, and as the box is so moved the X and Y motors are controlled such that the optics of the confocal imager is directed in X and Y at the user desired imaging positions with respect to the actual tissue surface, as well as to the earlier captured picture of the tissue surface of the macroscopic image 57 in window 56. The Z motor controls the depth of the confocal image in tissue, which is not controllable from the macroscopic imaging user interface.

Figure 7:
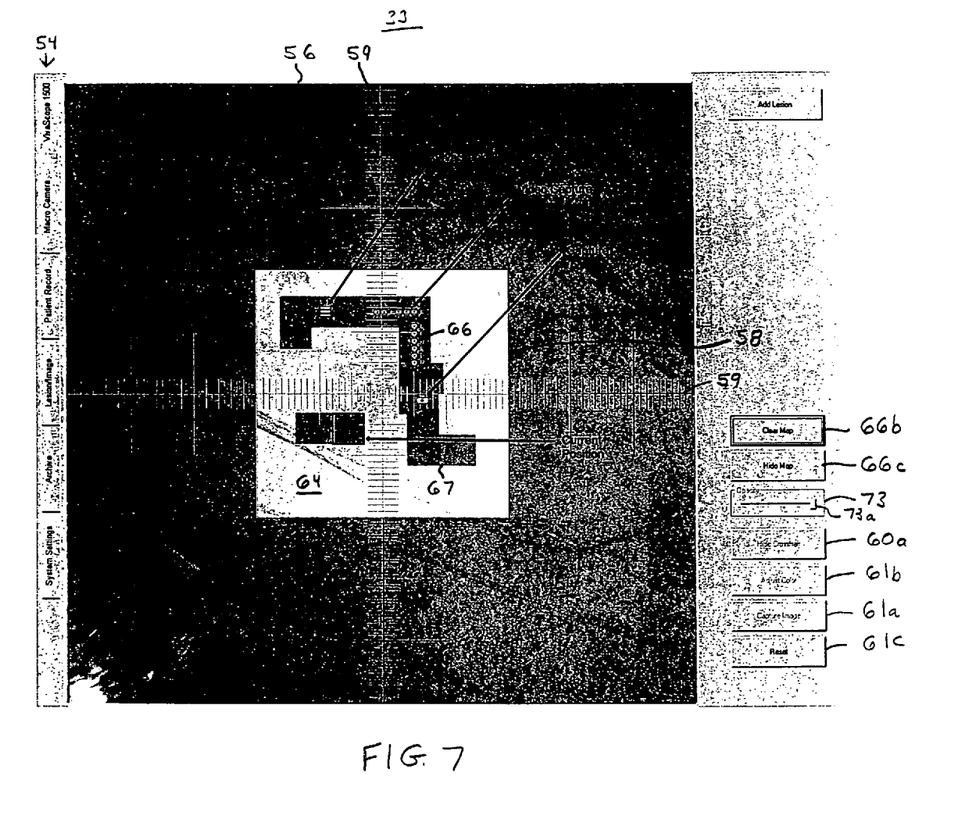

Selection of VivaScope® 1500 tab 54b provides live confocal images on the display 16 from confocal microscope 12. During operation of the VivaScope® 1500, confocal image(s) may be selected for storage in memory of the computer system in one or more formats described latter. The position of selected image(s) stored is recorded in a two-dimensional map in memory of the computer system, which is the same size as region 58. Such map 64 is shown as an overlay on region 58 in which graphical icons 66 are used to represent the position of stored confocal images, as shown in FIG. 7. Each of the graphical icons 66 represents a different type of image captured. For example, each of icons 66a represents the position with respect to the tissue surface of a video of multiple frames of confocal images. Icon 66b represents the capture of still confocal image. Icon 66c represents the position of a VivaStack® which are multiple confocal images at successive depths in the tissue at a common X,Y frame location. The darken path 67 shows the track of the confocal imager 18 taken, in which the box 62 shows the current imaging position of the confocal imager. Other types of images may also be captured, stored, and marked. For example, a VivaBlock® image represents tissue sections arranged to map a region of tissue at a common depth in the tissue. The map 64 may be cleared or hidden from view by selection of buttons 60b and 60c, respectively.

Other tabs selectable by the user, are patient records tab 54c for editing or viewing patient information, archive tab 54d for viewing images of previous sessions stored with the same or a different patient, system settings tab 54c to view or change parameters of imaging, such as dimensions and/or depth of VivaBlock® or VivaStack® map, coarse or fine X, Y, and Z motor step settings, freeze and hold time for a static image capture, and typical print preferences. For example, button 61a may be click by the user to capture a confocal image by the confocal microscope at a location in the tissue selected by box 62. Other buttons on the screen may be provided to adjust color 61b, or reset 61c the user interface to clear the displayed macroscopic image 57 and its overlaid map 64 thereby enabling capture of a new macroscopic image, if desired. Adjust color 61b allows the user to open a window to adjust imaging properties described earlier, which may be desirable for different skin types.

Each time the Add Lesion button 60d is selected, a new record is generated in which images stored in the session from thereon after are annotated (or tagged, or revised file name) with the new lesion name.

Figure 8:
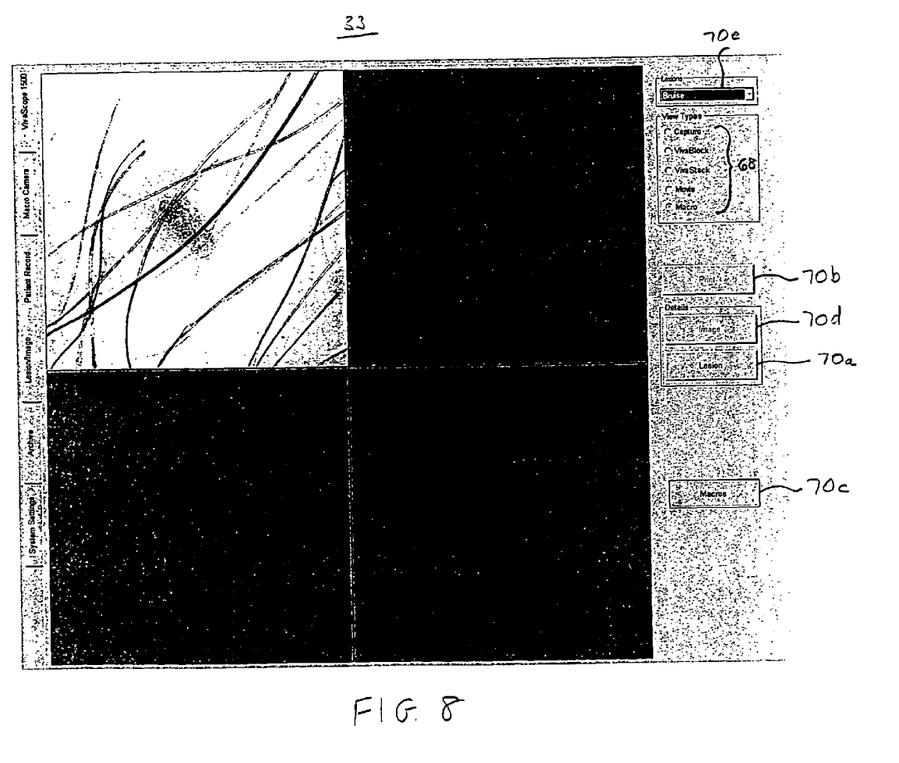
FIG. 8 is an example of another window of the user interface of FIGS. 5-7 operable on the computer system of FIG. 1 for viewing one or more previously captured macroscopic images stored in memory of the computer system.

Selecting the lesion/image tab 54e provides a display of one or more previously stored images in memory of computer system 14. The particular type of image displayed from memory is selected by one of radio buttons 68 to be one of a still image captures, VivaBlock® images, VivaStack® images, movie (video) image, or macro (macroscopic) images. When multiple images of different lesions (or different parts of the same lesion) are stored for the same patient record, each may be entered in field 70e or selected from a drop down menu by clicking on the down arrow adjacent this field.

Figure 9:
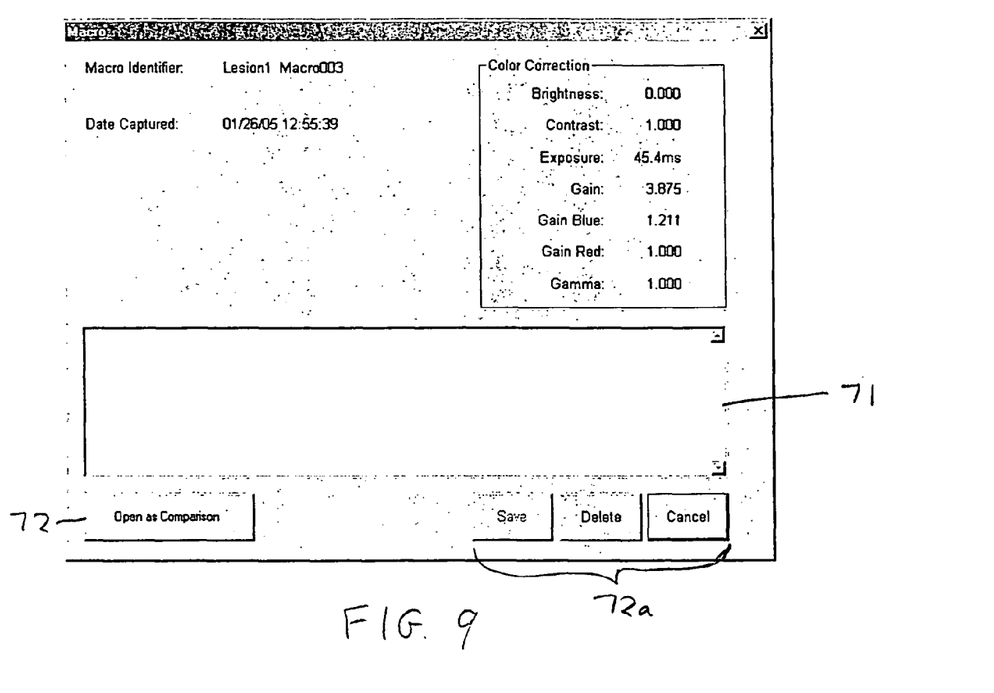
FIG. 9 is an example of a dialog screen of the user interface of FIGS. 5-7 for display and storing information about one of the images of FIG. 8.

By clicking on one of images displayed, the user may make a selection (e.g., graphically shown on the screen by a color outline of the boundaries of the image). (For purposes of illustration, one macroscopic image is shown by selection of the radio button 68 labeled macro) The user then by clicking with the mouse on one of the Lesion 70a or Image 70d buttons provides another screen/window having detailed information about the lesion or image, respectively, associated with the selected image. For example, FIG. 9 shows an example of such a screen/window when lesion information is presented by clinking Lesion button 70a for a macroscopic image, such as to display imaging parameters, date and time captured, or other information. Text may be entered in notes field 71 by the user, via a keyboard coupled to the computer system 13, and stored in associated with the image. Other buttons 72a on screen of FIG. 9 provide saving such comments in field 71 for associated with the image, deleting the stored image from memory of the computer system 13, or canceling edit or entered comments in field 71. Clicking cancel, save, or delete buttons 72a returns the user interface to screen of FIG. 8. A similar type of screen is provided by use of the Image button 70a to provide imaging detail, such as in the case of stored VivaBlock® (e.g., the depth of the image map), VivaStack® (e.g., the depths of each of the images from the tissue surface), or other images stored. Other buttons on FIG. 8 may be provided for printing 70b a selected image on a printer that may be coupled to computer system 14, or macros 70c to return to the main user interface 33 screen.

One feature of the user interface 33 is that two macroscopic images captured at different times of the same tissue surface may be compared. The current macroscopic image in window 56 represent a first one of such images, the second macroscopic image is selected by clicking on the Open as Comparison Button 72. For instance, the second macroscopic image may be an image of the same tissue captured several months ago. When such second macroscopic image is selected, the slide graphic 73 is activated having a slider 73a. The first and second macroscopic images morph (or blend) into each other by controlling their respective amount of contribution (or opacity of each image) controlled by clicking and dragging the slide graphic 73 right or left, where rightmost slide position is the most recent macroscopic image and leftmost slide position is the previous macroscopic image. Such comparison image is referred to as a morphed image, and the processing of changing the contribution of each of the images is referred to as morphing. Such morphing may be in accordance with typical alpha blending for processing two images into a single image. Where each macroscopic image is of the same area of tissue captured at different times, a user can view changes in the tissue over time.

Figure 10:
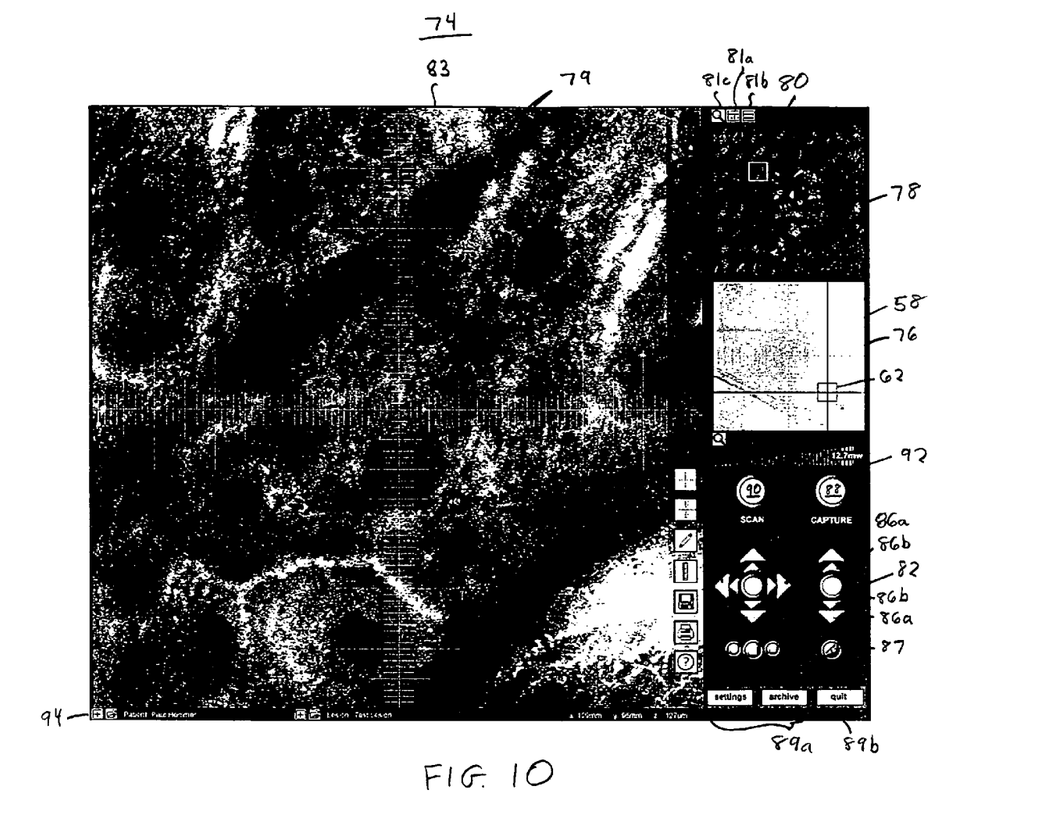
FIG. 10 is an example of another user interface operable on the computer system of FIG. 1 for viewing on the same screen of the display of the computer system images from the macroscopic imager and confocal imager.

Optionally a single screen may be provided with a common user interface to the macroscopic imager and confocal imager, such that the user can view confocal images, target and track on a macroscopic image without having to switch between screens as in the case of user interface 33. An example of such single screen user interface 74 is shown in FIG. 10. User interface 74 has a window 76 for display of the 4×4 mm region 58 with box 62, and a window 83 for display of a confocal image 79 from the confocal microscope 12 associated at the box 62 position. The images in the two windows 76 and 83 can switch (or flip) with each other by user selecting the magnifying glass graphic 77. When the image in window 76 is region 58 of the macroscopic image, box 62 is movable using the mouse to set the X and Y position of the confocal imager 18. To display live confocal images 79 in box 83 from the confocal microscope 12, the user clicks on Scan button 90. The capture button 88 stores in memory of the computer system 13 a still video image of the confocal image 79 shown in window 83. To capture a movie, three controls 95, record, pause, and stop buttons are selectable by the user to capture multiple frames which when played back will appear as a movie.

A window 78 is provided to obtain or review different images. For example, when graphic icon 81a is selected, a VivaBlock® map is captured by confocal imager 18 automatically scanning at a user desired depth a two-dimensional array of multiple images shown at locations corresponding to the entire 4×4 mm of region 58 (or user defined Xmm×Ymm rectangle or square) in window 76, and when graphic icon 81b is selected a VivaStack® is captured by the confocal imager at multiple depths at a frame associated with the X and Y position of box 62. A box 80 is provided which can be navigated by the user through the thumbnail (low-resolution) images in window 78 of either the VivaBlock® or VivaStack® captured. By clicking on graphical icon 81c, box 80 can click and move any edge of the box and make it a larger or smaller box. Such box 80 icon can be freely panned across images, such that it includes one image, multiple images, even parts of multiple images across image boundaries. As soon as the user starts to click and drag on box 80 with the mouse, the image selected in box 80 automatically replaces the image in window 83 to allow the user to view in high-resolution such image based on image content in box 80. Multiple graphic icons to zoom in and zoom out the image in window 78 by making the box larger or smaller in window 78 may replace icon 81c. Also, an icon may be provided to enable a drop down menu to provide field and button similar to field 70e and buttons 68, to enable window 78 to display thumbnail images of previously stored images. Again, icon 81c (or other icons enabling zoom in and out) with box 80 allows high-resolution images in window 83 of desired stored images. To resume scan of live confocal images, the Scan button 90 is selected by the user. Thus, the user may provide in window 78 any collection of stored images for review.

One feature of user interface 74 is that the user can move the X, Y, and Z motors of the confocal imager 18 using panel 82, rather than panel 26 (FIG. 1). For example, Y position is controlled by up and down arrows select two different step sizes in which arrows 84a and 84b can select a large or small step each time the arrow is clicked upon, or held down, by the user. X position is controlled by up and down arrows select two different step sizes in which arrows 85a and 85b can select a large or small step each time the arrow is clicked upon, or held down, by the user. The center circular button shown between arrows 84a, 84b, 85a and 85b when selected returns the X and Y motors each to their middle position. Z position is controlled by up and down arrows select two different step sizes in which arrows 86a and 86b can select a large or small step each time the arrow is clicked upon, or held down, by the user. To reset the current depth of imaging in the tissue as the zero depth position, the user can click on the Flag button 87. The center circular button shown between arrows 86a and 86b returns the Z motor to its top position, or to such Flagged position if set by button 87. Panel 82 thus includes at least a software version of panel 26 (FIG. 1) of the confocal imager 18.

The illumination power of the confocal imager 18 is shown by the ramp graphic 92. Text shown on this graphic represents the current illumination power setting. The power may be adjusted to a desired level by the user clicking on one on part of the graphic 92. If the mouse has a wheel, rotating the wheel may be used to change illumination power. A bottom bar 94 of interface 74 provide patient information, lesion information, and current confocal imaging position in X, Y, and Z.

Other graphical icons 96 are displayed on the user interface 74 as an overlay when the user directs the cursor the right portion of window 83. These icons 96 provide user tools as follows: add/remove cross-hairs in window 78 (e.g., cross graphic), add/remove series of centered circles of different diameters (circle graphic, annotating/drawing in an overlay on the image in window 83 (e.g., pencil graphic), measuring tool (e.g., ruler graphic), or desired operations, e.g., save (disk graphic) or print (printer graphic).

One or more measuring tool icons may be provided. For purposes of illustration, a straight measuring tool is shown, in which clicking on the tool provides a line which has two movable end points, in which the measurement between such points in terms of dimension of the tissue is displayed. Other measuring tool icons may be provided to enable a measuring square (or rectangle) and circle (or oval) by overlaying the image in window 83 in which their major vertices of such shape are connected by lines and such vertices are movable by the user, in which the measurements of dimensions in terms of tissue distances is displayed. Other measurement shaped tools may also be provided, such as polygon. The question mark graphic, if provided, allow user access to a help topics or user manual stored in memory of the computer system. When the capture button 88 is selected, any overlaid information added is stored in association with the image, such that when the image is selected by the user for later display in window 78, such overlaid information will be displayed. Also, map 64 (FIG. 7) with icons 66 is shown in window 76 as an overlay on a macroscopic region 58, as described earlier. The settings and archive buttons 89a operate similar to tabs 54c and 54d described earlier. The Quit button 89b exits the user interface 74. Icons 96 may also be active when any image is presented in window 83, such that both confocal and macroscopic images may be annotated by the user.

Other VivaScope® confocal microscope available from Lucid, Inc., such as the VivaScope® 2100 or VivaScope® 2500 may also be used in system 10 by adapting their imaging heads with tissue mount 48 so that they can be positioned to engage a tissue ring when mounted to in-vivo patient or ex-vivo tissue sample. Also other optical microscopes may be also adapted with such tissue mount 48. Such as, for example, microscopes operating in accordance with optical coherence tomography or interferometry, such as described in Schmitt et al., "Optical characterization of disease tissues using low-coherence interferometry," Proc. Of SPIE, Volume 1889 (1993), or two-photon microscopy, such as described in U.S. Pat. No. 5,034,613 to Denk et al., issued Jul. 23, 1991.

From the foregoing description, it will be apparent that a system, method, and user interface for macroscopic and confocal imaging of tissue has been provided. Variations and modifications in the herein described system, method, and user interface in accordance with the invention will undoubtedly suggest themselves to those skilled in the art. Accordingly, the foregoing description should be taken as illustrative and not in a limiting sense.

The invention claimed is:

1. A system for imaging tissue comprising:
   a macroscopic imager for capturing a macroscopic image;
   a microscopic imager for capturing one or more optically formed sectional microscopic images on or within tissue;
   a tissue attachment device in which said macroscopic imager and microscopic imager are each individually presentable to said tissue, wherein said tissue is not histologically prepared tissue that is mounted on a slide, utilizing said tissue attachment device in a predefined alignment with said tissue attachment device, wherein said tissue attachment device is adapted to attach to tissue that extends beyond said tissue attachment device; and
   a computer system coupled to said macroscopic imager and microscopic imager capable of receiving at least one macroscopic image from said macroscopic imager, and one or more microscopic images from said microscopic imager.

2. The system according to claim 1 wherein said computer system further comprises a display, and memory for storing said macroscopic and microscopic images, and said system further comprises a user interface operable on said computer system enabling display of said macroscopic image of said area of tissue when captured by said macroscopic imager on said display, outlining of a region within the macroscopic image associated with a field of view of the tissue imagable by said microscopic imager, and tracking on said displayed macroscopic image an imaging position of said microscopic imager with respect to the tissue displayed in said macroscopic image.

3. The system according to claim 2 wherein said computer system further comprises a pointing device for controlling the location of a graphic on said display, and said user interface further enables user targeting of two-dimensional position of the microscopic images captured by said microscopic imager with respect to the surface of said tissue by utilizing said pointing device to move said graphic in said outlined region of said displayed macroscopic image, in which the position of said graphic is spatially correlated in two-dimensions with the microscopic images captured by said microscopic imager.

4. The system according to claim 2 wherein said user interface further enables marking on said displayed macroscopic image the location of one or more of said microscopic images after being captured by said microscopic imager and stored in memory by said computer system.

5. The system according to claim 4 wherein said user interface further enables user selection of one of said marked locations enabling viewing on said display of said one or more stored microscopic images associated with said one of said marked locations.

6. The system according to claim 4 wherein said user interface provides said marking in an image overlay on said macroscopic image.

7. The system according to claim 6 wherein said tissue is associated with a patient, and said stored macroscopic image, stored microscopic images, and said image overlay are associated in said computer system with said patient.

8. The system according to claim 2 wherein said computer system is capable of storing different ones of said macroscopic image of said same area of tissue captured at different times, and said user interface further enables morphing two of said different ones of said macroscopic images to produce a morphed image.

9. The system according to claim 8 wherein said user interface has a graphic enabling a user to select different contributions of said two of said different ones of said macroscopic images in said morphed image so as to enable viewing of changes in said same area of tissue over the time period associated with said two of said different ones of said macroscopic images.

10. The system according to claim 2 wherein said the area of said displayed macroscopic image outside said outlined region is reduced in at least one of contrast or brightness.

11. The system according to claim 1 wherein said computer system has a display and memory, and said computer system is capable of storing different ones of said macroscopic image of said same area of tissue captured at different times, and said computer system further has a user interface capable of morphing two of said different ones of said macroscopic images to produce a morphed image.

12. The system according to claim 11 wherein said user interface has a graphic enabling a user to select different contributions of said two of said different ones of said macroscopic images in said morphed image so as to enable viewing of changes in said same area of tissue over the time period associated with said two of said different ones of said macroscopic images.

13. The system according to claim 2 wherein said user interface further enables user selection to display real-time microscopic images captured by said microscopic imager.

14. The system according to claim 1 wherein said microscopic imager represents a confocal microscope.

15. The system according to claim 1 wherein said microscopic imager operates in accordance with one of confocal microscopy, two-photon microscopy, or optical coherence tomography.

16. A method for imaging tissue comprising the steps of:
    displaying on a display a macroscopic image of the surface of said tissue captured by a macroscopic imager via a device providing a field of view of the tissue, wherein said tissue is not histologically prepared tissue that is mounted on a slide, and in which the tissue extends outside of said device;
    outlining on said display a region within said macroscopic image associated with a field of view imagable by a microscopic imager capable of optically formed sectional microscopic images on or within tissue via said device;
    tracking on said display the two-dimensional position of said microscopic imager with respect to the surface of said tissue in said macroscopic image; and
    marking on said display of said macroscopic image the location of one or more of said microscopic images captured by said microscopic imager, wherein said displaying, outlining, tracking, and marking steps are carried out with the aid of a computer system coupled to said display.

17. The method according to claim 16 further comprising the step of:
    targeting in said macroscopic image of said tissue on said display the two-dimensional position of microscopic images captured by the microscopic imager with respect to said tissue, wherein said targeting step is carried out with the aid of said computer system.

18. The method according to claim 16 further comprising the steps of:

morphing on said display two macroscopic images of said same area captured at different times into a morphed image; and selecting the contribution to said morphed image of each of said two macroscopic images to enable viewing of changes in said same area of tissue over the time period associated with said two of said different ones of said macroscopic images, wherein said morphing and selecting steps are carried out with the aid of said computer system.

19. A user interface operable on a computer system coupled to a macroscopic imager and a microscopic imager, said computer system having memory for storing at least one macroscopic image when received from said macroscopic imager and said microscopic images when received from said microscopic imager, said user interface comprising:

a first window displaying said macroscopic image, and a region within the macroscopic image associated with a field of view of tissue, wherein said tissue is not histologically prepared tissue that is mounted on a slide, imagable by said microscopic imager;

a second window selectable by the user displaying a plurality of macroscopic images of said same area captured at different times for enabling selection of two of said plurality of macroscopic images, wherein at least one of said plurality of macroscopic images of said same area was captured utilizing a device providing a field of view of the tissue in which the tissue extends outside of said device; and a slide in which said first window has an morphed image of said two selected macroscopic images in which the contribution of each of said two image in said morphed image is adjustable by the user utilizing said slide.

20. A user interface operable on a computer system coupled to a macroscopic imager and a microscopic imager, said computer system having memory for storing at least one macroscopic image of the surface of tissue when received from said macroscopic imager, and one or more microscopic images when received from said microscopic imager, said user interface comprising:

a window displaying said macroscopic image, and an outline of a region within the macroscopic image associated with the tissue imagable by said microscopic imager;

one or more first elements for enabling tracking and targeting in said region of a two-dimensional imaging location of said microscopic imager with respect to the surface of said tissue, wherein said tissue is not histologically prepared tissue that is mounted on a slide; and one or more second elements for enabling marking in said region of said window the location of one or more of said microscopic images after being captured by said microscopic imager and stored in memory by said computer system, in which said one or more second elements are capable of indicating when multiple microscopic images are captured at different depths at a common two-dimensional imaging location.

21. An apparatus for facilitating imaging of tissue comprising:

first means attachable to tissue providing a field of view of the tissue, wherein said tissue is not histologically prepared tissue that is mounted on a slide, in which the tissue extends beyond said first means; and second means releasably coupled to said first means, said second means being mounted to third means for imaging tissue macroscopically, in which when said second means is coupled to said first means enables said third means to image tissue in said field of view of said first means, and a different one of said second means being mounted to fourth means for imaging tissue microscopically below the surface of the tissue, in which when said different one of said second means is mounted to said first means enables said fourth means to image tissue in said field of view of said first means.

22. The apparatus according to claim 21 wherein said first means enables said third means and fourth means to be spatially correlated with each other in their respective imaging.

* * * * *